United States Patent
Tajima

(10) Patent No.: US 7,339,596 B2
(45) Date of Patent: Mar. 4, 2008

(54) PROJECTION PLANE COLOR CORRECTION METHOD OF PROJECTOR, PROJECTION PLANE COLOR CORRECTION SYSTEM OF PROJECTOR AND PROGRAM FOR PROJECTION PLANE COLOR CORRECTION OF PROJECTOR

(75) Inventor: Johji Tajima, Tokyo (JP)

(73) Assignee: NEC Corporation, TOkyo (JP)

( * ) Notice: Subject to any disclaimer, the term of this patent is extended or adjusted under 35 U.S.C. 154(b) by 0 days.

(21) Appl. No.: 10/436,268

(22) Filed: May 13, 2003

(65) Prior Publication Data
US 2003/0214510 A1    Nov. 20, 2003

(30) Foreign Application Priority Data
May 17, 2002    (JP)    ............... 2002-143529

(51) Int. Cl.
G09G 5/02    (2006.01)
(52) U.S. Cl. ............ 345/600; 345/207; 345/590; 345/591; 345/592; 353/121; 353/122
(58) Field of Classification Search ........ 345/590–592, 345/589, 600, 644; 348/659; 353/121, 122
See application file for complete search history.

(56) References Cited

U.S. PATENT DOCUMENTS

| | | | | |
|---|---|---|---|---|
| 6,243,059 B1 * | 6/2001 | Greene et al. | ................ | 345/88 |
| 6,412,956 B2 * | 7/2002 | Fujita et al. | ................ | 353/122 |
| 6,633,302 B1 * | 10/2003 | Ohsawa et al. | ............ | 345/604 |
| 6,791,565 B2 * | 9/2004 | Kanai | .......................... | 345/589 |
| 6,826,303 B2 * | 11/2004 | D'Souza et al. | ............ | 382/167 |
| 7,061,547 B2 * | 6/2006 | Wada | ........................ | 348/602 |
| 7,110,002 B2 * | 9/2006 | Wada | ........................ | 345/600 |

FOREIGN PATENT DOCUMENTS

| EP | 1 178 672 A2 | 2/2002 |
|---|---|---|
| JP | 4-53374 | 2/1992 |
| JP | 2002-041016 | 2/2002 |

OTHER PUBLICATIONS

Chinese Office Action dated Sep. 23, 2005, with English translation.
Japanese Office Action dated Dec. 12, 2006 with a partial English translation.

* cited by examiner

*Primary Examiner*—Kee M. Tung
*Assistant Examiner*—Antonio A Caschera
(74) *Attorney, Agent, or Firm*—McGinn IP Law Group, PLLC

(57) ABSTRACT

By using a spectral reflectance of a projection plane or color information under a light source, which is stored in wall color storage means 4, matrix calculation means 5 calculates a conversion matrix, and mixing amounts R, G, B of primary colors of an input image are converted into corrected mixing amounts R', G', B', and they are projected by means of a projector. Thereby, even in a case where a wall is colored, correct color reproduction is made in a colorimetric manner.

27 Claims, 3 Drawing Sheets

PROJECTION PLANE COLOR CORRECTION METHOD OF PROJECTOR, PROJECTION PLANE COLOR CORRECTION SYSTEM OF PROJECTOR AND PROGRAM FOR PROJECTION PLANE COLOR CORRECTION OF PROJECTOR

BACKGROUND OF THE INVENTION

The present invention relates to a projection plane color correction method of a projector, a projection plane color correction system of a projector and a program for projection plane color correction of a projector, and especially, to a projection plane color correction method of a projector, a projection plane color correction system of a projector and a program for projection plane color correction of a projector, which can realize good color reproduction in case that a color image is projected on a wall or the like having a color.

One example of a conventional projector with a correction circuit is described in JP-P1992-53374A "a projector with a correction circuit". As shown in FIG. 4, in this conventional projector with a correction circuit, an image projected on a projection plane 8 from a projector 10 is read by an information detection section 11, and a correction circuit 12 conducts a white balance adjustment and a brightness adjustment. The image in which a color and brightness are adjusted is projected again by means of the projector 10 via a driver 13.

Since it is not at all herein how the white balance adjustment is conducted, it is not known how it is realized, and however, it is conjectured that, in the white balance (white balance) adjustment generally conducted in a television technology, intensity of three kinds of primary color light of red (R), green (G) and blue (B) is adjusted, and in case that white is tinted with yellow due to influence of the projection plane 8 for example, blue light is made m.sub.b times more than usual, and a white color is obtained on the projection plane when white light is projected.

In other words, when intensities of red, green and blue of original each pixel are R, G and B, correction such as an equation (1) is conducted, and color light having intensities of R', G' and B' is projected. Here, $m_r$, $m_g$ and $m_b$ are proportional coefficients.

$$\begin{pmatrix} R' \\ G' \\ B' \end{pmatrix} = \begin{pmatrix} m_r \cdot R \\ m_g \cdot G \\ m_b \cdot B \end{pmatrix} \quad (1)$$

In this manner, white color is displayed in corrected color.

With regard to a task in the above-described and shown conventional method, only white color is a strict object of the correction, and only balance is approximately corrected for other colors in a color image. Accordingly, other than an exceptional case, correct color reproduction of a color image cannot be conducted.

SUMMARY OF THE INVENTION

The objective of the present invention is to provide a projection plane color correction method of a projector, a projection plane color correction system of a projector and a program for projection plane color correction of a projector, which can conduct color correction of the projector based on a principle of color reproduction.

In the present invention, in a projector for projecting a color image on a projection plane such as a wall plane to display an image, color correction of the projection plane is conducted by converting a mixing amount of primary colors to be projected on an original (for example, white) projection plane into a mixing amount of primary colors for reproducing an equal color by means of mixture of primary colors including color information of the projection plane.

Also, in the present invention, in a projector for projecting a color image on a projection plane such as a wall plane to display an image, color reproduction is conducted within a range of reproduction by converting a mixing amount of primary colors to be projected on an original projection plane into a mixing amount of primary colors for reproducing an equal color by means of mixture of primary colors including color information of the projection plane, and further, applying color area compression to a color which appears outside a range of reproduction by means of said conversion.

Also, in the present invention, in a projector for projecting a color image on a projection plane such as a wall plane to display an image, spectral information or color information of the projection plane such as a wall plane is measured by a color sensor, and color correction of the projection plane is self-sufficiently conducted by using said measured information.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
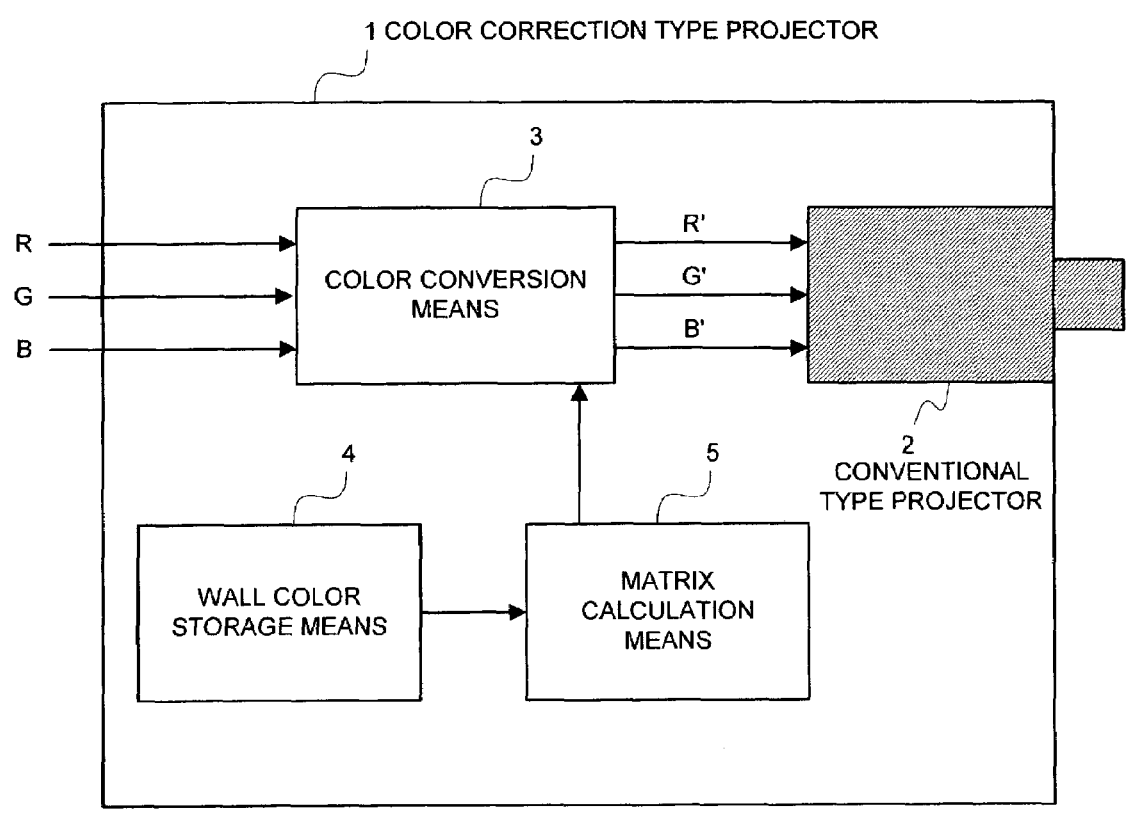
FIG. 1 is a block diagram showing a configuration of a first embodiment of the present invention.

First, a principle of the correction of a projection plane color correction system in the present invention will be explained based on a theory of color reproduction. Originally, a color projector projects a desired color by mixing three kinds of primary color light, similarly to a CRT or the like. Assuming that spectral intensities per unit intensity of the three kinds of primary color light are $I_r$, $I_g$ and $I_b$, and that respective relative intensities are R, G and B, arbitrary light I projected from the projector is written as an equation (2).

$$I = (I_r I_g I_b) \begin{pmatrix} R \\ G \\ B \end{pmatrix} \quad (2)$$

Here, for example, $$I = (I_{380} \ I_{385} \ \ldots \ I_{780})^t$$

$$I_r = (I_{r,380} \ I_{r,385} \ \ldots \ I_{r,780})^t$$

$$I_g = (I_{g,380} \ I_{g,385} \ \ldots \ I_{g,780})^t$$

$$I_b = (I_{b,380} \ I_{b,385} \ \ldots \ I_{b,780})^t$$

and respective elements show intensities of light in each wavelength. Measuring color of this light, it becomes an equation (3) by means of CIE1931 XYZ coordinates.

$$\begin{pmatrix} X_I \\ Y_I \\ Z_I \end{pmatrix} = \begin{pmatrix} \bar{x}^t \\ \bar{y}^t \\ \bar{z}^t \end{pmatrix} \cdot I \quad (3)$$

Here, $$\bar{x}^t, \bar{y}^t, \bar{z}^t$$

are color matching functions.

For colorimetric color reproduction, these three stimulus values $X_I$, $Y_I$ and $Z_I$ are realized on the projection plane. Although there is no problem if the projection plane is a white screen, in case that it is a cream-colored wall, color without modification becomes as follows: Assuming that a spectral reflectance of the wall is $\beta$, $$\beta = \begin{pmatrix} \beta_{380} & 0 & \cdots & 0 \\ 0 & \beta_{385} & \cdots & 0 \\ \vdots & \vdots & \ddots & \vdots \\ 0 & 0 & \cdots & \beta_{780} \end{pmatrix} \quad (4)$$

the components of each primary color light is changed due to the color of the wall, and it looks like color light such as an equation (5) in eyes.

$$I'_r = \beta I_r = (\beta_{380} I_{r,380} \ \beta_{385} I_{r,385} \ \ldots \ \beta_{780} I_{r,780})$$

$$I'_g = \beta I_g = (\beta_{380} I_{g,380} \ \beta_{385} I_{g,385} \ \ldots \ \beta_{780} I_{g,780})$$

$$I'_b = \beta I_b = (\beta_{380} I_{b,380} \ \beta_{385} I_{b,385} \ \ldots \ \beta_{780} I_{b,780}) \quad (5)$$

Mixed light also becomes I' of an equation (6), and a colorimetric value becomes an equation (7).

$$I' = (I'_r I'_g I'_b) \begin{pmatrix} R \\ G \\ B \end{pmatrix} \quad (6)$$

$$\begin{pmatrix} X'_I \\ Y'_I \\ Z'_I \end{pmatrix} = \begin{pmatrix} \bar{x}^t \\ \bar{y}^t \\ \bar{z}^t \end{pmatrix} \cdot I' \quad (7)$$

These three stimulus values are different from the original values, and become different color.

However, it is understood from the above-described analysis that, since, in order to make reproduced colors coincide with each other within both color reproduction ranges, the three stimulus values, in which the equation (7) is applied to I' obtained when the relative intensities of each primary colors of the equation (6) are assumed as R', G' and B' different from R, G and B, coincide with each other, an equation (8) can be established.

$$\begin{pmatrix} \bar{x}^t I_r & \bar{x}^t I_g & \bar{x}^t I_b \\ \bar{y}^t I_r & \bar{y}^t I_g & \bar{y}^t I_b \\ \bar{z}^t I_r & \bar{z}^t I_g & \bar{z}^t I_b \end{pmatrix} \begin{pmatrix} R \\ G \\ B \end{pmatrix} = \begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix} \begin{pmatrix} R' \\ G' \\ B' \end{pmatrix} \quad (8)$$

If this is solved for R', G' and B', an equation (9) is a solution.

$$\begin{pmatrix} R' \\ G' \\ B' \end{pmatrix} = \begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix}^{-1} \begin{pmatrix} \bar{x}^t I_r & \bar{x}^t I_g & \bar{x}^t I_b \\ \bar{y}^t I_r & \bar{y}^t I_g & \bar{y}^t I_b \\ \bar{z}^t I_r & \bar{z}^t I_g & \bar{z}^t I_b \end{pmatrix} \begin{pmatrix} R \\ G \\ B \end{pmatrix} \quad (9)$$

Otherwise, $$\begin{pmatrix} R' \\ G' \\ B' \end{pmatrix} = A \begin{pmatrix} R \\ G \\ B \end{pmatrix} \quad (10)$$

Here, $$A \equiv \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \equiv \begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix}^{-1} \begin{pmatrix} \bar{x}^t I_r & \bar{x}^t I_g & \bar{x}^t I_b \\ \bar{y}^t I_r & \bar{y}^t I_g & \bar{y}^t I_b \\ \bar{z}^t I_r & \bar{z}^t I_g & \bar{z}^t I_b \end{pmatrix} \quad (11)$$

Elements which appeared in the equation (11) can be calculated if spectral intensity of the projector and a spectral reflectance of the projection plane are known or can be measured or if primary color values of the projector and a color reflected on the projection plane of primary color light of the projector are known or can be measured. Incidentally, in CIE 1931-XYZ coordinates, since the primary color values of the projector are represented by $$\text{red:} \begin{pmatrix} X_r \\ Y_r \\ Z_r \end{pmatrix} = \begin{pmatrix} \bar{x}^t I_r \\ \bar{y}^t I_r \\ \bar{z}^t I_r \end{pmatrix}$$

$$\text{green:} \begin{pmatrix} X_g \\ Y_g \\ Z_g \end{pmatrix} = \begin{pmatrix} \bar{x}^t I_g \\ \bar{y}^t I_g \\ \bar{z}^t I_g \end{pmatrix},$$

$$\text{blue:} \begin{pmatrix} X_b \\ Y_b \\ Z_b \end{pmatrix} = \begin{pmatrix} \bar{x}^t I_b \\ \bar{y}^t I_b \\ \bar{z}^t I_b \end{pmatrix}$$

and similarly, the color reflected on the projection plane of the primary color light of the projector is represented by $$\text{red:} \begin{pmatrix} X'_r \\ Y'_r \\ Z'_r \end{pmatrix} = \begin{pmatrix} \bar{x}^t \beta I_r \\ \bar{y}^t \beta I_r \\ \bar{z}^t \beta I_r \end{pmatrix},$$

$$\text{green:} \begin{pmatrix} X'_g \\ Y'_g \\ Z'_g \end{pmatrix} = \begin{pmatrix} \bar{x}^t \beta I_g \\ \bar{y}^t \beta I_g \\ \bar{z}^t \beta I_g \end{pmatrix},$$

$$\text{blue:} \begin{pmatrix} X'_b \\ Y'_b \\ Z'_b \end{pmatrix} = \begin{pmatrix} \bar{x}^t \beta I_b \\ \bar{y}^t \beta I_b \\ \bar{z}^t \beta I_b \end{pmatrix}$$

the equation (11) can be also written as an equation (11').

$$A \equiv \begin{pmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{pmatrix} \equiv \begin{pmatrix} X'_r & X'_g & X'_b \\ Y'_r & Y'_g & Y'_b \\ Z'_r & Z'_g & Z'_b \end{pmatrix}^{-1} \begin{pmatrix} X_r & X_g & X_b \\ Y_r & Y_g & Y_b \\ Z_r & Z_g & Z_b \end{pmatrix} \quad (11')$$

To make sure, the correction of white balance, which is a prior art, will be explained below. It is assumed that an original design is made so that a color becomes white when relative intensity of each primary color light of the projector is 1. Then, relative intensities $R'_w$, $G'_w$ and $B'_w$ when white is displayed can be obtained as an equation (12) by substituting 1 for R, G and B in the equation (9).

$$\begin{pmatrix} R'_w \\ G'_w \\ B'_w \end{pmatrix} = \begin{pmatrix} \bar{x}^t \beta I_r & \bar{x}^t \beta I_g & \bar{x}^t \beta I_b \\ \bar{y}^t \beta I_r & \bar{y}^t \beta I_g & \bar{y}^t \beta I_b \\ \bar{z}^t \beta I_r & \bar{z}^t \beta I_g & \bar{z}^t \beta I_b \end{pmatrix}^{-1} \begin{pmatrix} \bar{x}^t I_r + \bar{x}^t I_g + \bar{x}^t I_b \\ \bar{y}^t I_r + \bar{y}^t I_g + \bar{y}^t I_b \\ \bar{z}^t I_r + \bar{z}^t I_g + \bar{z}^t I_b \end{pmatrix} \quad (12)$$

And, since, for the relative intensities normalized in this manner, the three primary color intensities are changed at a ratio same as the conventional one, and the projection is conducted, assuming that k is a constant for example, a form in which an equation (13) is substituted for the equation (1) is obtained.

$$\begin{pmatrix} m_r \\ m_g \\ m_b \end{pmatrix} = k \begin{pmatrix} R'_w \\ G'_w \\ B'_w \end{pmatrix} \quad (13)$$

Reflected light becomes one shown as an equation (14) instead of the equation (6).

$$I' = (I'_r \ I'_g \ I'_b) \begin{pmatrix} m_r R \\ m_g G \\ m_b B \end{pmatrix} \quad (14)$$

The three stimulus values become $$\begin{pmatrix} X_r \\ Y_r \\ Z_r \end{pmatrix} = \begin{pmatrix} m_r \bar{x}^t \beta I_r & m_g \bar{x}^t \beta I_g & m_b \bar{x}^t \beta I_b \\ m_r \bar{y}^t \beta I_r & m_g \bar{y}^t \beta I_g & m_b \bar{y}^t \beta I_b \\ m_r \bar{z}^t \beta I_r & m_g \bar{z}^t \beta I_g & m_b \bar{z}^t \beta I_b \end{pmatrix} \begin{pmatrix} R \\ G \\ B \end{pmatrix} \quad (15)$$

and generally, are not proportional to XYZ values of the equation (3).

Next, embodiments of the present invention will be explained in detail by referring to drawings. A color correction type projector 1 of a first embodiment of the present invention will be explained by referring to FIG. 1. To the color correction type projector 1, three primary color video signals R, G and B are input. Originally, if these three primary color video signals R, G and B are input to a conventional type projector 2, an image in correct color is displayed on a white screen. These three primary color video signals R, G and B are input to color conversion means 3, and are converted into three primary color video signals R', G' and B' by means of a matrix A of 3×3 shown in the equation (11), and are applied to the conventional type projector 2. Wall color storage means 4 stores information in relation to a wall color, and matrix calculation means 5 obtains the matrix A based on the said information, and outputs it to the color conversion means. The above-described color conversion means 3 conducts the above-described conversion using the said A.

As mentioned before, the information stored in the wall color storage means 4 may be a spectral reflectance with respect to a wall color or may be information with respect to a color of three stimulus values or the like of reflected light that is generated when three primary color light of a light source being used in the conventional type projector 2 is reflected by a wall.

The function of the matrix calculation means 5 is constructed so that, if the information stored in the wall color storage means 4 is the spectral reflectance with respect to the wall color, based on this information, known color matching functions and spectral intensity of three primary color light of the light source being used in the conventional type projector 2, the matrix A is calculated by means of the equation (11). Also, if the information stored in the wall color storage means 4 is the information with respect to a color of the three stimulus values or the like of the reflected light that is generated when the three primary color light of the light source is reflected by the wall, the function of the matrix calculation means 5 is constructed so that the matrix A is calculated by means of the equation (11') based on this information and known color information of the three primary color light of the light source being used in the conventional type projector 2.

In addition, in the above-described explanation, the color correction type projector 1 includes the conventional type projector 2, the color conversion means 3, the wall color storage means 4 and the matrix calculation means 5 therein, and the three primary color signals provided from an outside are constructed so as to be signals same as ones in a case where an image is projected on a white screen by using the conventional type projector 2. However, in case that the conventional type projector 2 is used for a display device of a computer for example, exactly the same advantage can be established by executing the color conversion means 3, the wall color storage means 4 and the matrix calculation means 5 as a program within the computer, and providing the conventional type projector 2 with a (R', G', B') value that is a conversion result thereof.

Figure 2:
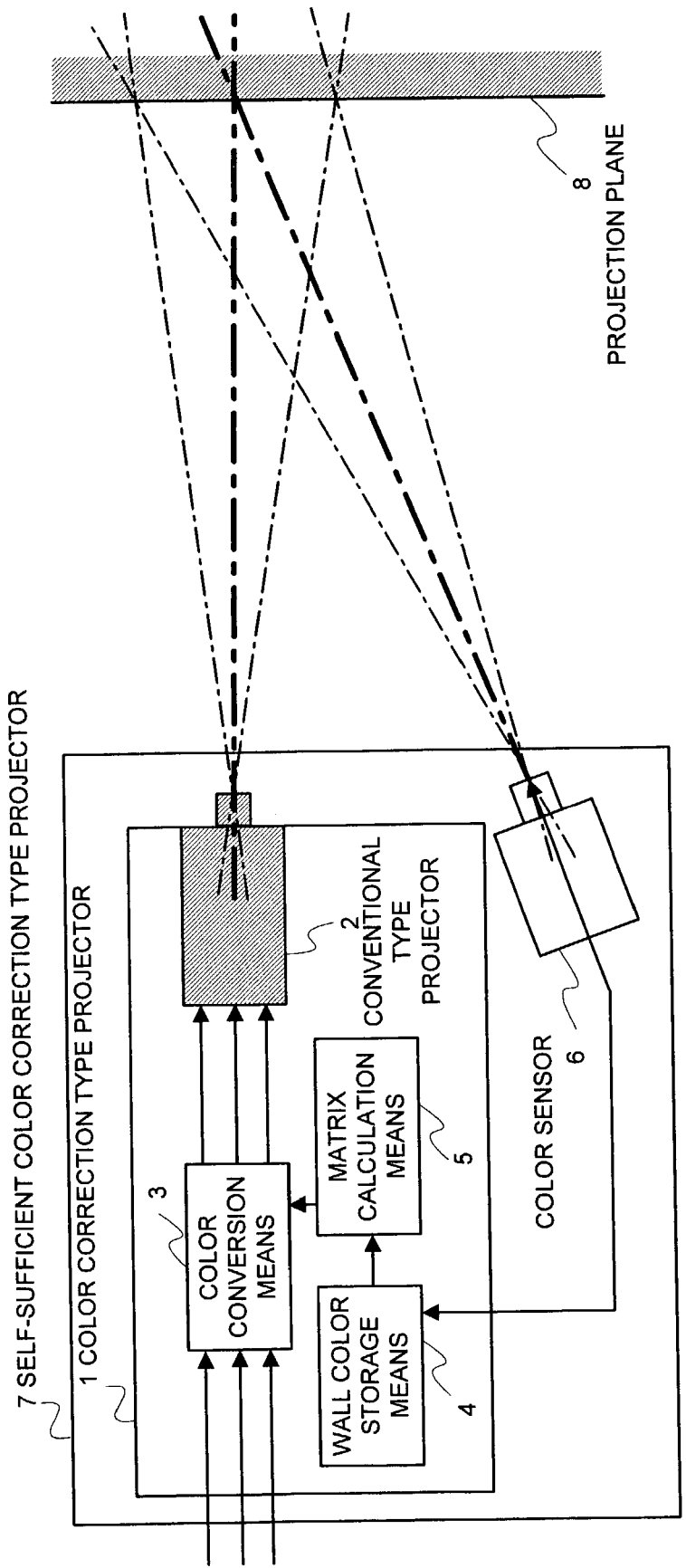
FIG. 2 is a block diagram showing a configuration of a second embodiment of the present invention.

A self-sufficient color correction type projector 7 of a second embodiment of the present invention will be explained by referring to FIG. 2. In the self-sufficient color correction type projector 7, a color sensor 6 is added to the above-mentioned color correction type projector 1. The color sensor 6 measures a color of a central part in an area where the color correction type projector 1 projects an image on a projection plane 8. An embodiment of the self-sufficient color correction type projector 7 will be explained below. Below, it is assumed that R, G and B signals provided to the color correction type projector 1 from an outside take values between 0 and 1, respectively. 0 is a darkest value and 1 is a brightest value. In fact, for example, in case that an encode method having 8 bit of a digital value is used, a value obtained by multiplying it by 255 is used.

A calibration mode appears in a situation in which the projection plane 8 such as a wall is defined, and first, the projector projects red of a primary color when (R, G, B)=(1, 0, 0), green of a primary color when (R, G, B)=(0, 1, 0), and blue of a primary color when (R, G, B)=(0, 0, 1) on the projection plane 8, and a color of the projection plane at that time is measured by the color sensor. By means of this measurement, $(X'_r, Y'_r, Z'_r)$, $(X'_g, Y'_g, Z'_g)$ and $(X'_b, Y'_b, Z'_b)$ for the projection plane 8 are obtained. These data are transferred to the wall color storage means 4 of the color correction type projector 1. The matrix calculation means 5 calculates the correction matrix A by means of the equation (11') by using these values and known $(X_r, Y_r, Z_r)$, $(X_g, Y_g, Z_g)$ and $(X_b, Y_b, Z_b)$ that are the original three stimulus values.

In addition, in the above-described explanation, although the self-sufficient color correction type projector 7 includes the color correction type projector 1 and the color sensor 6 therein, in case that the projector is used for a display device of a computer, exactly the same advantage can be also established by means of a configuration in which the color sensor 6 is connected to the computer, and the information with respect to the wall color is provided to the color correction type projector 1 from the computer. Also, as mentioned above, in case that the color conversion means 3, the wall color storage means 4 and the matrix calculation means 5 are executed as a program within the computer, exactly the same advantage can be established by executing whole processing until the color conversion by means of a program by using an input value from the color sensor, and providing the conventional type projector 2 with a (R', G', B') value that is a conversion result thereof.

According to the present invention, even in a case in which a color image is projected on a colored wall, it becomes possible to project the color image in correct color in a colorimetric manner by means of the projector. However, although, by means of the conversion such as the equation (11) to a (R, G, B) value of the original image, a value of (R', G', B') which controls each primary color is obtained, it is expected that any value exceeds a range between 0 and 1, which is a control range, due to the conversion matrix A. This means that a color reproduction range of the projector becomes narrower due to a color of the wall or the like. Usually, since density of a color being used for a wall or the like is low, its impact on the color reproduction of an image is small, and however, in case of projection to a wall or the like with a color having high density, an impact caused by narrowness of a color reproduction area becomes larger.

As a method for reproducing an original image without a sense of discomfort to a device in which the color reproduction area is narrow as mentioned above, various kinds of image conversion methods for, without a sense of discomfort, outputting an image to be displayed on a color monitor such as a CRT to a color printer or the like in which a color reproduction area is narrow are conventionally known. For example, in JP-P1993-127640A "an automatic color reproduction area conversion method, an automatic color reproduction area conversion apparatus and an automatic color conversion apparatus", a method for conducting most appropriate color conversion for such a case is described.

Figure 3:
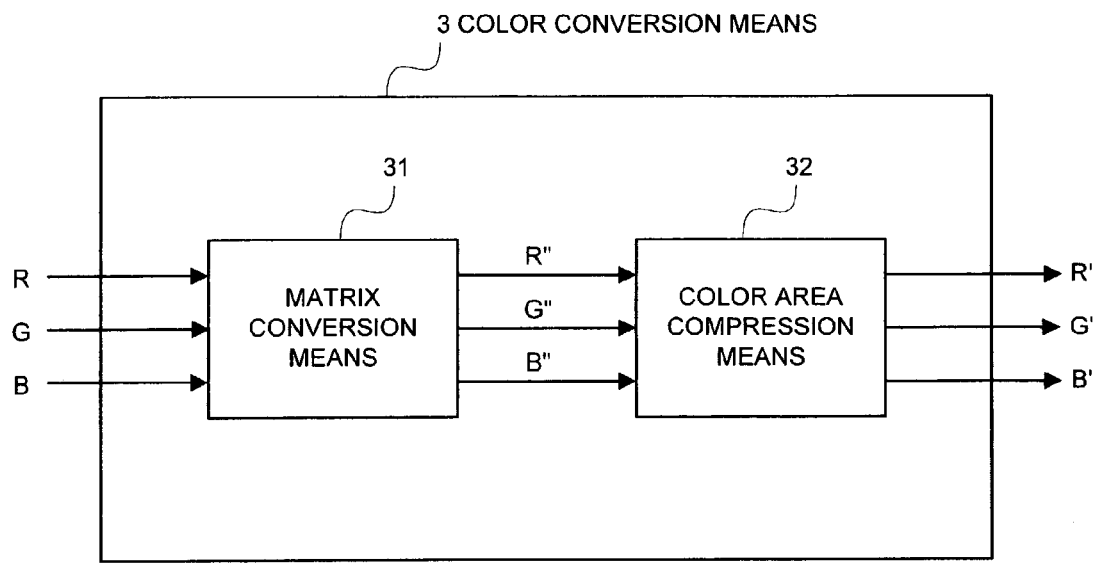
FIG. 3 is a block diagram showing an embodiment in which a function of color reproduction area conversion is included in color conversion means of a color correction type projector of the present invention.
Figure 4:
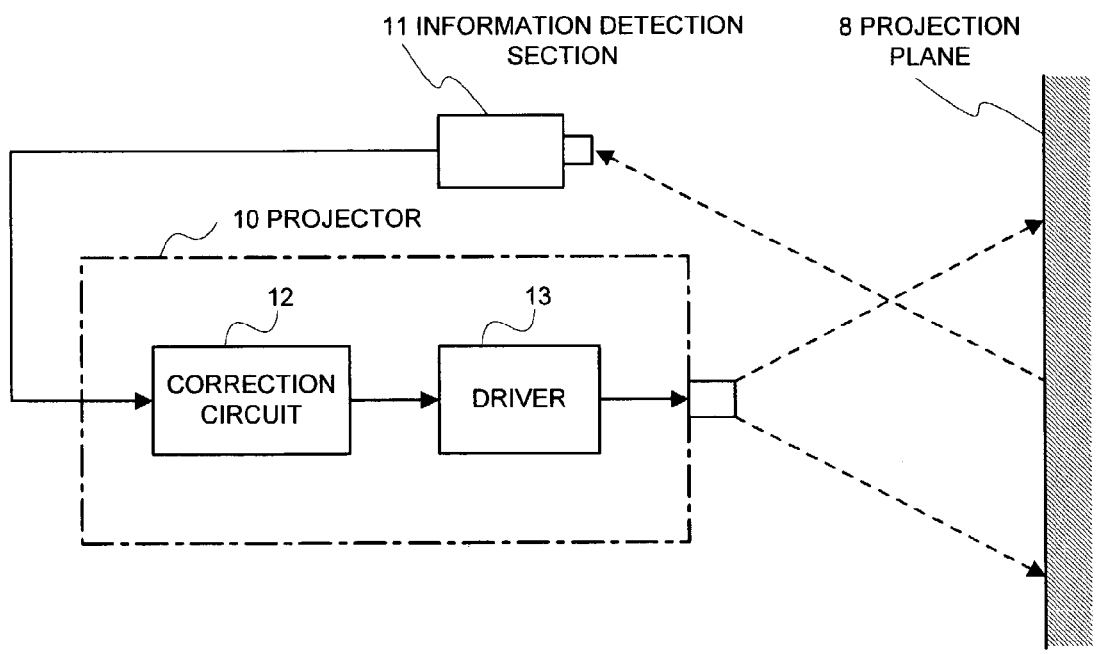
FIG. 4 is a block diagram explaining a conventional example.

An embodiment in which a function of the color reproduction area conversion is included in the color conversion means 3 of the color correction type projector 1 of the present invention will be explained by referring to FIG. 3. Here, matrix conversion means 31 applies the conversion of the equation (11) or the equation (11') to the original (R, G, B) value that becomes an input, and outputs (R", G", B"). Although these values sometimes have a value outside a color reproduction area other than a value between 0 and 1, color area compression means 32 is further applied to this, and a value (R', G', B') within the reproduction area is output and is applied to the conventional type projector 2. If such a configuration is adopted, it is possible to display a color image with a small sense of discomfort even on a wall with a color having high density.

In the present invention, although the matrix calculation is used for the conversion of a mixing amount of elemental primary colors, a part or entire of this calculation can be realized by means of calculation in which an LUT (Look Up Table) is retrieved for a typical value, and an interval there between is interpolated. If such a realization method is used, it is possible to realize a part of the above-mentioned color reproduction area conversion also by including it in the LUT simultaneously.

In the present invention, since it becomes possible to conduct correct color reproduction in a colorimetric manner by, for the colored projection plane such as a wall, measuring the color in advance or measuring the color by means of the color sensor, and by calculating a change in a color of primary color light, there is an advantage that good color reproduction can be conducted even for the colored projection plane.

Also, although, in case that the density of the wall color is high, the color reproduction area becomes narrower and an image with a high sense of discomfort is obtained, by utilizing the known color area compression means, color reproduction which reduces a sense of discomfort can be established.

What is claimed is:

1. A method of projection plane color correction for a projector that projects a color image on a projection plane to display an input image, said method comprising:
    inputting a first amount of three primary colors that project the input image with a correct color on an original screen different from the projection plane;
    obtaining color information from the original screen and from the projection plane under a three-primary color light from the projector;
    calculating a conversion matrix based on a difference between the obtained color information of the original screen and the obtained color information of the projection plane;
    converting the first amount of the three primary colors of the input image into a second amount of the three primary colors of a projection image using the conversion matrix; and
    projecting the second amount of primary colors of the projection image on the projection plane to display the input image on the projection plane with the correct color.

2. A method of projection plane color correction as recited in claim 1, further comprising using as the color information obtained from the projection plane one of a measured spectral reflectance and reflected color of the projection plane.

3. A method of projection plane color correction as recited in claim 1, wherein said color conversion is conducted within a range of reproduction.

4. A method of projection plane color correction as recited in claim 1, wherein the original screen is white.

5. A method of projection plane color correction as recited in claim 1, wherein the three-primary color light from the projector is white light.

6. A method of projection plane color correction for a projector that projects a color image on a projection plane to display an input image, said method comprising;
    calculating a conversion matrix using the color information of the projection plane;
    converting the amount of primary colors of the input image into an amount of primary colors of a projection image, based on the conversion matrix;
    applying color area compression to a color which appears outside a range of reproduction following said conversion; and
    projecting the amount of primary colors of the projection image, including any compressed colors, on the projection plane to display the input image,
    wherein the conversion matrix is calculated based on a difference between color information from an original screen and from the projection plane under a three-primary color light from the projector.

7. A method of projection plane color correction as recited in claim 6, further comprising using as the color information of the projection plane one of a measured spectral reflectance or reflected color of the projection plane.

8. A method of projection plane color correction as recited in claim 6, wherein said color conversion is conducted within a range of reproduction.

9. A projection plane color correction system for a projector that projects a color image on a projection plane to display an input image, said system comprising:
    a primary color conversion establishment unit for calculating a conversion matrix based on reflected color information of the projection plane;
    a color conversion unit for converting the amount of primary colors of the input image into an amount of primary colors of a projection image, based on the conversion matrix; and
    a projector for projecting the amount of primary colors of the projection image on the projection plane to display an image,
    wherein the conversion matrix is calculated based on a difference between color information obtained from an original screen and from the projection plane under a three-primary color light from the projector.

10. A projection plane color correction system for a projector as recited in claim 5, wherein said color conversion unit comprises a primary color conversion unit and a color area compression unit.

11. A projection plane color correction system for a projector as recited in claim 9, further comprising:
    a wall color storage unit; and
    a color sensor for sensing reflected color information of the projection planes to obtain the color information and for applying the sensed color information to said wall color storage unit.

12. A projection plane color correction system as recited in claim 9, wherein said color conversion unit converts the amount of primary colors within a range of reproduction.

13. A computer-readable medium tangibly embodying a program of machine readable instructions executable by a digital processing apparatus to perform projection plane color correction for a projector that projects a color image on a projection plane to display an input image, said program, when executed:
    calculates a conversion matrix based on color information of the projection plane;
    converts the amount of primary colors of the input image into an amount of primary colors of a projection image, based on the conversion matrix; and
    projects the amount of primary colors of the projection image on said projection plane,
    wherein the conversion matrix is calculated based on a difference between color information from an original screen and from the projection plane under a three-primary color light from the projector.

14. A computer-readable medium as recited in claim 13, wherein said color conversion comprises primary color conversion and color area compression.

15. A computer-readable medium as recited in claim 13, wherein said method further comprises reading the color information of said projection plane from a color sensor.

16. A computer-readable medium as recited in claim 13, wherein said color conversion is conducted within a range of reproduction.

17. A computer-readable medium encoded with a computer program which executes a projection plane color correction method on a projector that projects a color image on a projection plane to display an input image, said program, when executed:
calculates a conversion matrix based on color information of the projection plane;
converts the amount of primary colors of the input image into an amount of primary colors of a projection image, based on the conversion matrix; and
projects the amount of primary colors of the projection image on said projection plane,
wherein the conversion matrix is calculated based on a difference between color information from an original screen and from the projection plane under a three-primary color light from the projector.

18. A computer-readable medium as recited in claim 17, wherein said color conversion comprises primary color conversion and color area compression.

19. A computer readable medium as recited in claim 17, wherein said method further comprises reading the color information of said projection plane from a color sensor.

20. A computer-readable medium as recited in claim 17, wherein said color conversion is conducted within a range of reproduction.

21. A projection plane color correction system for a projector that projects a color image on a projection plane to display an input image, said system comprising:
means for calculating a conversion matrix based on color information of the projection plane;
means for converting the amount of primary colors of the input image into an amount of primary colors of a projection image, based on the conversion matrix; and
means for projecting the amount of primary colors of the projection image on the projection plane to display the input image,
wherein the conversion matrix is calculated based on a difference between color information from an original screen and from the projection plane under a three-primary color light from the projector.

22. A method of projection plane color correction for a projector that projects a color image on a projection plane to display an input image, said method comprising:
calculating a conversion matrix based on color information of an original projection plane;
converting the amount of two primary colors of the input image into an amount of primary colors of a projection image, based on the conversion matrix; and
projecting the amount of primary colors of the projection image on the projection plane to display the input image,
wherein the conversion matrix is calculated based on a difference between color information from the original projection plane and from the projection plane under a three-primary color light from the projector.

23. A method of projection plane color correction for a projector that projects a color image on a projection plane to display an input image, said method comprising;
calculating a conversion matrix based on color information, obtained under a three-stimulus light from the projector, of an original screen having color information different from color information of the projection plane;
converting the amount of two primary colors of the input image into an amount of primary colors of a projection image, based on the conversion matrix;
applying color area compression to a color which appears outside a range of reproduction following said conversion; and
projecting the amount of primary colors, including any compressed colors, on the projection plane to display the input image,
wherein the conversion matrix is calculated based on a difference between color information from the original screen and from the projection plane under a three-primary color light from the projector.

24. A projection plane color correction system for a projector that projects a color image on a display projection plane to display an input image, said system comprising:
a primary color conversion establishment unit for calculating a conversion matrix based on color information of an original projection plane having color information different from the color information of the display projection plane;
a color conversion unit for converting the amount of two primary colors of the input image into an amount of primary colors of a projection image, based on the conversion matrix; and
a projector for projecting the amount of primary colors of the projection image on the display projection plane to display the input image,
wherein the conversion matrix is calculated based on a transformation matrix from the amount of primary colors of the input image to three-stimulus values and an inverse matrix of a transformation matrix from the amount of primary colors of the projection image to three-stimulus values.

25. A computer-readable medium tangibly embodying a program of machine readable instructions executable by a digital processing apparatus to perform projection plane color correction for a projector that projects a color image on a display projection plane to display an input image, said program, when executed:
calculates a conversion matrix based on color information of an original projection plane having color information different from the color information of the display projection plane;
converts the amount of two primary colors of the input image into an amount of primary colors of a projection image, based on the conversion matrix; and
projects the amount of primary colors of the projection image on said display projection plane,
wherein the conversion matrix is calculated based on a transformation matrix from the amount of primary colors of the input image to three-stimulus values and an inverse matrix of a transformation matrix from the amount of primary colors of the projection image to three-stimulus values.

26. A computer-readable medium encoding a program for causing performance of a projection plane color correction method on a projector that projects a color image on a display projection plane to display an input image, said program, when executed:
calculates a conversion matrix based on color information of an original projection plane having color information different from the color information of the display projection plane;

converts the amount of two primary colors of the input image into an amount of primary colors of the projection image, based on the conversion matrix; and projects the amount of primary colors of the projection image on said display projection plane, wherein the conversion matrix is calculated based on a transformation matrix from the amount of primary colors of the input image to three-stimulus values and an inverse matrix of a transformation matrix from the amount of primary colors of the projection image to the three-stimulus values.

27. A projection plane color correction system for a projector that projects a color image on a display projection plane to display an input image, said system comprising:

means for calculating a conversion matrix based on color information of an original projection plane having color information different from the color information of the projection plane;

means for converting the amount of two primary colors of the input image into an amount of primary colors of a projection image, based on the conversion matrix; and means for projecting the amount of primary colors of the projection image on the projection plane to display the input image, wherein the conversion matrix is calculated based on a transformation matrix from the amount of primary colors of the input image to three-stimulus values and an inverse matrix of a transformation matrix from the amount of primary colors of the projection image to the three-stimulus values.

* * * * *